United States Patent [19]

Morel

[11] 4,111,570
[45] Sep. 5, 1978

[54] BALL AND SOCKET JOINT CAGE

[75] Inventor: Henri Morel, Maule, France

[73] Assignee: ITW de France, S.A., Beauchamp, France

[21] Appl. No.: 781,223

[22] Filed: Mar. 25, 1977

[30] Foreign Application Priority Data

Mar. 25, 1976 [FR] France ............... 76 08757

[51] Int. Cl.² ............................. F16C 11/10
[52] U.S. Cl. .................... 403/18; 403/141; 403/321
[58] Field of Search ........... 403/122, 141, 142, 143, 403/316, 317, 290, 76, 77, 133, 136, 140, 18, 321; 29/149.5 B; 308/72

[56] References Cited

U.S. PATENT DOCUMENTS

| 3,113,780 | 12/1963 | Livingstone | 403/122 X |
| 3,224,801 | 12/1965 | Price-Stephens et al. | 403/122 |
| 3,367,728 | 2/1968 | Labbie | 403/122 X |
| 3,503,640 | 3/1970 | Eberle | 403/122 |
| 3,759,555 | 9/1973 | Ito | 403/122 |
| 3,787,129 | 1/1974 | Kohler | 403/135 |

FOREIGN PATENT DOCUMENTS

| 198,143 | 6/1958 | Austria | 403/141 |
| 506,722 | 6/1971 | Switzerland | 403/141 |

Primary Examiner—Andrew V. Kundrat
Attorney, Agent, or Firm—Jack R. Halvorsen; Robert W. Beart

[57] ABSTRACT

A ball and socket joint cap having a plurality of elastic latching elements for accepting a ball therein, each of said elastic latching elements being locked in installed position by a rigid member positioned behind the latching element and each locking member being simultaneously activated by a common operator so that the latching elements are all simultaneously locked for retention of the ball. The cap has secondary means for attachment to a rod and/or for mounting it in an apertured panel.

8 Claims, 17 Drawing Figures

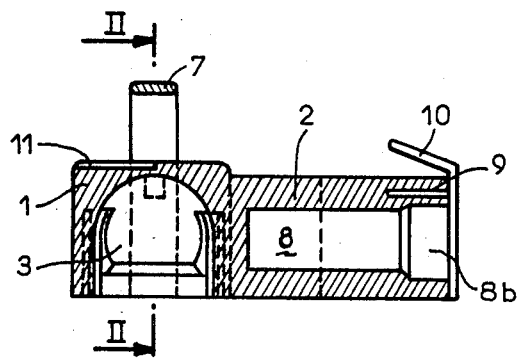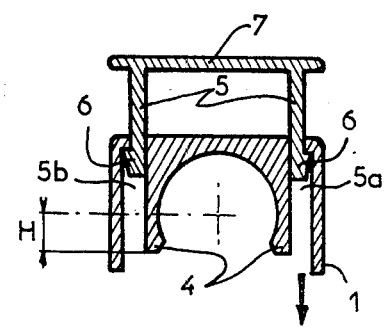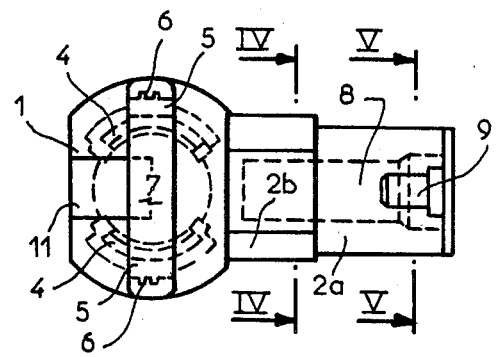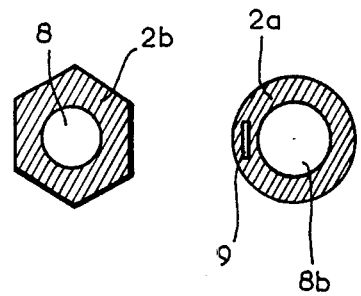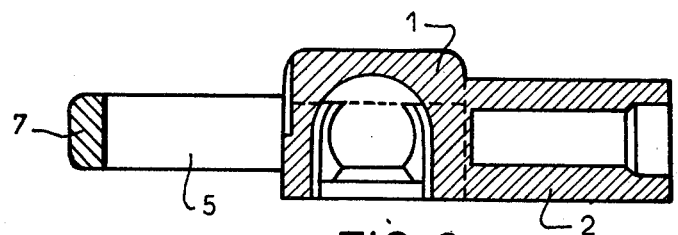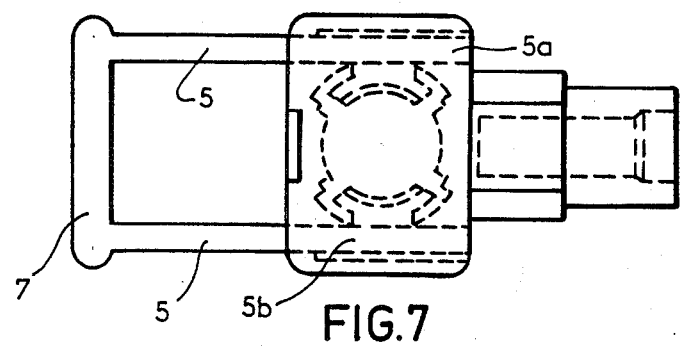

BALL AND SOCKET JOINT CAGE

In the prior art of a ball-and-socket joint cap (hereinafter referred to as a ball cage) made of plastic or thermoplastic material there has been shown a cage for housing a ball and at least one elastic locking element for restraining the ball in its rigid housing. A groove, a recess, a slot, or a notch or other cavity is formed in the cage to accept a catch or latching device which is so positioned to continuously urge said elastic element against said ball after the same is inserted into its cage. Such elastic locking element is formed by a tongue-like elastic blade having a projection thereon which, during its ball locking action, cooperates with at least one other preferably diametrically opposed rigid projection integral with the internal wall of the ball cage, whereby the locking element performs the function of a rigid abutment element for the ball in its housing.

The present invention provides an improvement to such prior art ball cage, in that each elastic locking element necessarily and compulsorily has opposed to it a companion elastic locking element with a single latching element acting simultaneously on the two or more elastic elements.

In accordance with further characteristics of this improvement:

the latching device is of the mandrel or keeper-ring type acting directly on the elastic locking elements;

the ball is secured to a support and the ball cage is provided with means for receiving and fixing an actuating rod also capable of performing any desired function in addition to that of mere actuation;

the ball cage is secured to a support and the ball is provided with means for receiving and fixing an actuating rod capable of also performing any desired function in addition to that of mere actuation;

the ball cage is mounted in a cavity formed in a support and is secured thereto by elastic elements formed on the cage and cooperating with the walls and/or edges of said cavity and by a latching device which acts both on the ball locking elastic elements and on the elastic elements securing the cage to its support.

A ball cage according to this invention offers the following combined advantages:

easy and secure assembly of the ball in the cage;

a variable degree of play of the ball in the cage to suit requirements;

easy and secure assembly of an actuating rod.

The description which follows with reference to the accompanying non-limitative exemplary drawings will give a clear understanding of how the invention can be carried into practice.

In the drawings:

FIG. 1 shows in sectional side elevation a ball cage according to the invention adapted to additionally perform an electrical function;

FIG. 2 is a sectional view through the line II—II in FIG. 1;

FIG. 3 shows said ball cage in plan view;

FIG. 4 is a sectional view through the line IV—IV of FIG. 3;

FIG. 5 is a sectional view through the line V—V of FIG. 3;

FIG. 6 shows in sectional side elevation an alternative embodiment of a ball cage according to the invention;

FIG. 7 is a side elevation view corresponding to FIG. 6;

Figure 8:
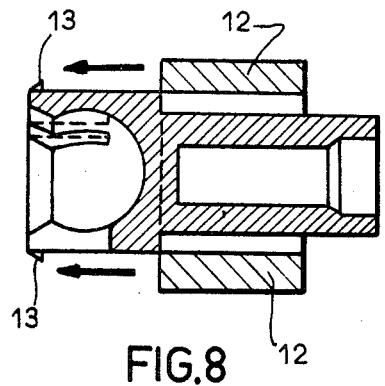
FIG. 8 is a sectional side elevation of a second alternative embodiment of a ball cage according to the invention.

Referring to the drawings, FIGS. 1 through 11 relate to a ball-cage fixed to one end of an actuating rod with the cage mounted on a ball which is itself secured to a support, whereas FIGS. 12 through 16 relate to a ball cage directly mountable on a support and adapted to receive a ball mounted on the end of an actuating rod. For greater clarity, the ball is omitted from all the drawings but is ordinarily a conventional ball screwed or otherwise fixed to a support, or a ball having actuating-rod-bearing means in cases where it is enclosed in a ball cage which is itself fixed to the support.

The ball cages of this invention (shown in FIGS. 1 through 7) comprise a rigid injection molded plastic body 1 of any convenient outer shape having a barrel 2 for acceptance of an actuating rod and a cavity 3 for receiving the ball (both rod and ball not shown). Provided within this cavity 3 are at least two concave elastic blades 4 the radii of curvature of which in both the vertical and horizontal planes are substantially equal to the radius of the ball.

Formed in the body 1 (in the embodiments shown in FIGS. 1 through 7) are two wells 5a-5b, one of the walls of which is formed by the straight dorsal portions of the elastic blades 4, these wells being adapted to receive the active tightening elements 5 of at least one removable mandrel and these elements being interconnected by a bridge 7 (FIGS. 1 to 3). The lower end of each element 5 is formed with a catch 6, the function of which will emerge clearly from the description which follows. The barrel 2 preferably includes a polygonal portion 2b extended by a circular portion 2a which is formed with a bore 8 therethrough and a recess 9.

When it is inserted into its cage, the ball spreads the flexible blades 4, which are arranged around the ball on a circumference of diameter substantially equal to the ball diameter. The remaining fixed sectors of the body 1 are accordingly caused to exactly correspond to the ball diameter.

The ball cage thus closely hugs the shape of the ball. The bridge 7 for driving the mandrel elements 5 is then forcibly lowered in the direction of the arrow (FIG. 2), thereby to positively restrain the ball in the cage. The ball can be more or less powerfully restrained in its cage by operating on the diameter of the cage cavity 3 and on the curvature of elastic blades 4. It is furthermore possible to achieve a progressive tightening action of the elastic blades on the ball by operating on the shape of the mandrel elements or the keeper-ring (for instance by imparting frusto-conical walls or camming shapes thereto).

Freedom of play of the cage about the ball can likewise be calculated according to requirements, either by imparting greater or lesser clearance to the ball head on its rod or by reducing the ball trapping distance H (FIG. 2) beyond the equatorial plane of the ball.

The barrel 2 for receiving the usually metallic actuating rod is preferably designed so that a threaded portion on the rod is self-tapping into the plastic. In order not to damage the ball cage during this forcible operation, a portion 2b of any polygonal shape (shown hexagonal in FIG. 4) is provided to restrain the barrel throughout the operation of screwing the rod into bore 8. The bore 8 is preferably provided with a guiding entry 8b. Obviously, however, the actuating rod could alternatively be fixed to the cage by spring latching or any other convenient means.

In cases where the addition of an electrical contact is necessary, a recess 9 is formed in the body of the cage barrel for receiving an electrical connection terminal 10 having a harpoon-shaped tip for positively securing the terminal in the ball cage recess 9 and preventing it from rotating relative to the rod whereon a locknut makes it fast therewith. Alternatively, the terminal could be immovably restrained by the metal rod itself through the agency of a ridge formed thereon or of a locknut. As a rule, the metal rod provides electrical conductivity; it can be electrically insulated by an external sheath if necessary, while the insulating plastic ball cage prevents earthing of the electric current carried by the rod.

The ball-and-socket joint of this invention can be dismantled by engaging a screwdriver into the notch 11 (FIGS. 1 and 3) in order to lift the bridge 7, thereby raising mandrels 5 and releasing elastic blades 4, whereby the ball is freed in its cage and can be pulled out therefrom.

Any risk of losing the bridge-mandrels unit is obviated by virtue of the catches 6 engaging with the upper rim of the body 1.

FIGS. 6 and 7 show the joint assembly according to the invention with the mandrels 5 oriented in a different plane. Manifestly, the direction of penetration of the mandrels for locking the elastic blades can be along any plane whatsoever.

Figure 9:
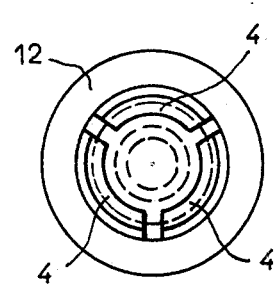
FIG. 9 is a plan view corresponding to FIG. 8.

FIGS. 8 and 9 show an alternative embodiment of the joint assembly according to the invention. In this case, locking of the flexible blades 4 illustrated in the drawing is effected by an integral frangibly connected keeper-ring 12 having the same outer diameter as the flexible blades 4 surrounding the ball. When the ball cage is fitted over the ball fixed to its support, the elastic blades spread apart and allow the ball to be positioned inside the cage. Keeper-ring 12 is then shifted in the direction of the arrow (FIG. 8) breaking its frangible connection to the cage and effectively locks the ball in position by locking all the flexible blades. Shifting of the keeper-ring can be limited by catches 13 molded onto the exterior of the flexible blades. Clearly, the direction of penetration of the keeper-ring for locking the flexible blades can be along any plane whatsoever. Disassembly is effected by releasing the keeper-ring and thereby freeing the ball.

Figure 10:
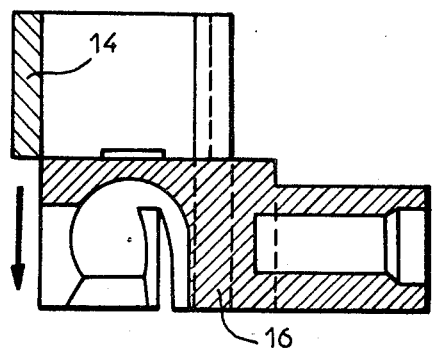
FIG. 10 shows in sectional side elevation a third alternative embodiment of a ball cage according to the invention.
Figure 11:
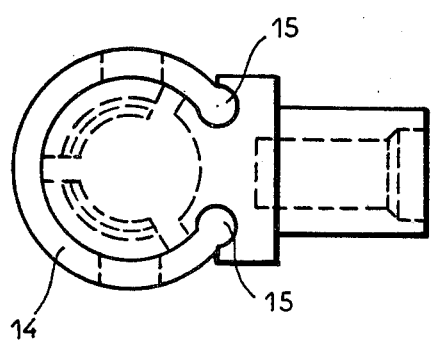
FIG. 11 is a plan view corresponding to FIG. 10.

FIGS. 10 and 11 illustrate yet another embodiment of the joint assembly according to this invention. In this case locking of the flexible blades is effected by an open ring 14 having two terminal bulges 15 thereon. Said bulges are adapted to be slideable inside a matching recess 16 formed in the body of the part. Ring 14 is shown to have descended in the direction of the arrow (FIG. 10) whereby to lock the flexible blades. This is a variant on the keeper-ring referred to with reference to FIGS. 8 and 9.

Figure 12:
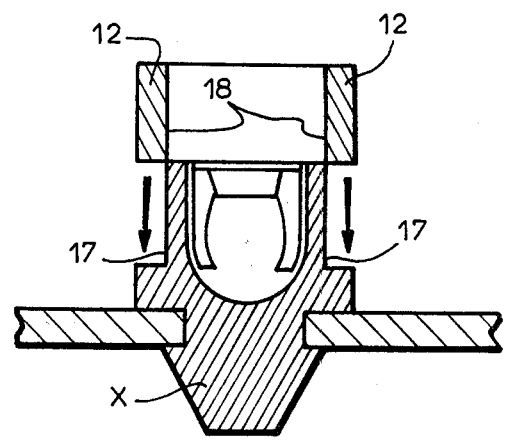
FIG. 12 shows in sectional side elevation a ball cage according to the invention mounted on a support.
Figure 13:
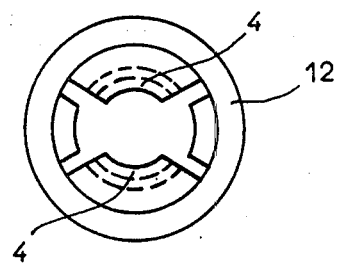
FIG. 13 is a plan view corresponding to FIG. 12.

FIGS. 12 and 13 show a ball cage adapted to be fixed on a support. All that has been described with reference to the different ball cage embodiments adapted to contain a ball which is itself fixed to a support applies likewise to this form of embodiment, save that the actuating-rod-supporting barrel is dispensed with and replaced by a fixture to the support. Any convenient fixing method may be used.

FIG. 12 illustrates a spring latching type of fixture X (without going into details thereof), in which locking of the flexible blades 4 by a keeper-ring 12 is accomplished by a downward movement of the keeper-ring in the direction shown by the arrows. The keeper-ring can be restrained in its locking position by engagement of a flange 17 into a groove 18. Disassembly is effected by forcible disengagement of flange 17, using a simple tool like a screwdriver for example.

Figure 14:
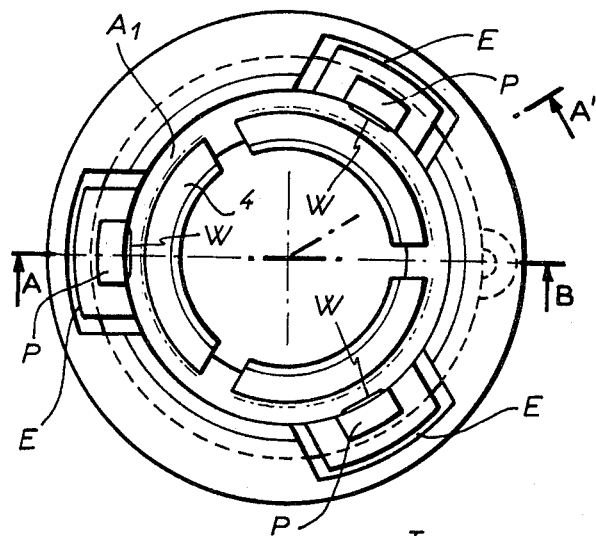
FIG. 14 shows in plan view still another form of embodiment of the ball cage according to the invention provided with means for mounting it on a support.
Figure 15:
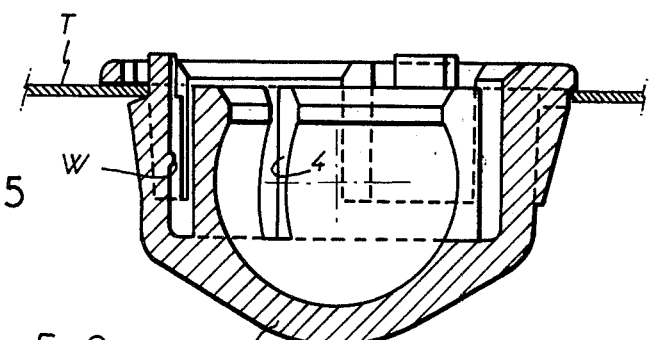
FIGS. 15 and 16 are respectively sectional side elevations taken through the lines A—B and A—A in FIG. 14.
Figure 16:
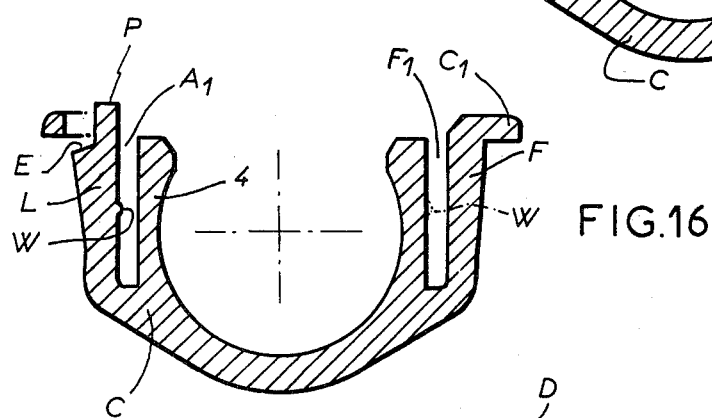

Referring now to FIGS. 14 through 16, these Figures illustrate an arrangement in which a ball cage, according to the invention, is fixed to a plate T.

In this embodiment, the skirt F of ball cage C is laterally extended at its upper end by a head or thrust collar $C_1$ and further includes indents or slots $F_1$ along its length, which form three elastic blades L each having gripping stubs P and an intermediate shoulder E facing collar $C_1$.

Figure 17:
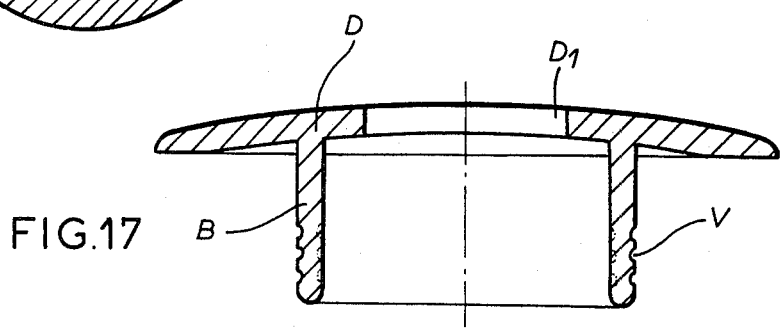
FIG. 17 is a sectional side elevation of a so-called ball cap for both tightening the ball and securing the cage to a support.

Thus, it will be readily appreciated that said cage can be forcibly inserted into the opening of appropriate diameter in plate T until it bears against its flange $C_1$ with shoulders E springing back and underlying the opposite side of plate T. A capping part D, such as illustrated in FIG. 17, is a part formed by an annular ring B surmounted by a cap D having an orifice $D_1$ in its center for passage of the ball-actuating rod (not shown), which ball is complimentary to and acceptable for seating between blades 4. The ring B of cap D is then inserted into the annular space $A_1$ bounded by the inner face of the cage skirt F, by the inner faces of elastic blades L and by the outer faces of elastic locking blades 4. Said cap D acts laterally both on the blades L and the blades 4. In acting on blades 4 it urges them to bear against and hug the ball; in acting against blades L, it forces them apart, thereby locking the shoulders E beneath the undersurface of plate T. Thus, the cage is effectively restrained and cannot be released unless cap D is withdrawn and the blades L moved into a position permitting withdrawal of cage C from its lodging in T, which can be accomplished by applying an inwardly directed force on the stubs P. The capping portion of cap D additionally forms a cover or plug for ball cage C. In order to more effectively secure cage C, the outer face of ring B may be formed with notches or incisions V for cooperating with matching protrusions W formed on the inner faces of elastic blades L and/or on the outer faces of elastic blades 4.

Manifestly, this form of embodiment can be adopted irrespective of the location of the center of the ball having its actuating rod fixed to it, even if said center lies in the plane of, or above or below the support.

It goes without saying that many changes and substitutions may be made to the forms of embodiment hereinbefore described for exemplary purposes, without departing from the scope of the invention as set forth in the appended claims.

I claim:

1. In a plastic ball-and-socket joint or ball cage formed by a body comprising a cage for housing a spherical ball and at least two tongue-shaped elastic blade cantilever locking elements adapted to restrain the ball in its housing, said blades each having a projection thereon substantially opposite at least a portion of another projection on a second blade integral with the cage, a slot in said body formed behind each of said blades for permitting free radial movement thereof toward and away from said ball and latching means interconnected by a common operator, said latching means adapted to be accepted in said slot behind each blade whereby said latching means can be moved linearly to co-act simultaneously and directly with each of said blades to simultaneously urge them in locked opposed relation against the ball after said ball is inserted into said cage.

2. An improvement as claimed in claim 1, in which said at least two diametrically opposed elastic blade elements are concave and wherein the radii of curvature of which in both the vertical and horizontal planes are substantially equal to the radius of curvature of said spherical ball.

3. An improvement as claimed in claim 1, in which said latching device is generally U-shaped where each leg of said U-shaped device acts on one of said elastic locking elements with said interconnecting portion acting as a common operator for said legs.

4. An improvement as claimed in claim 1, in which the body of said cage includes a laterally extending barrel and a screw-thread therein adapted to receive an actuating rod.

5. An improvement as claimed in claim 1, in which said body is formed with a recess adapted to receive a harpoon-shaped electrical connection terminal.

6. An improvement as claimed in claim 1, in which said ball cage is fixed to an apertured support adapted to receive said cage, said cage being formed about its periphery and about the outer surfaces of said slot with secondary oppositely facing elastic elements adapted to be urged by said latching device to spread apart and engage beneath the rim of the aperture in said support.

7. An improvement as claimed in claim 6, in which said latching device includes a centrally apertured cap adapted to accept a ball carrying rod therethrough, said cap having an annular depending flange which is accepted within said slot to simultaneously urge said blades and said secondary elastic elements in opposite directions.

8. An improvement as claimed in claim 7, in which said annular flange and said cage slot includes complimentary notch and protuberance locking means.

* * * * *